*INVENTOR.*
VINCENT A. GILL
BY
*Harry G. Shapiro*
ATTORNEY

United States Patent Office 2,973,182
Patented Feb. 28, 1961

2,973,182

VALVE STRUCTURE

Vincent A. Gill, Montclair, N.J.

Filed Nov. 28, 1956, Ser. No. 624,791

4 Claims. (Cl. 251—174)

The invention relates to valves, and is more particularly directed to improvements in valves of the type wherein a plug or ball valve is mounted in a tubular body for rotation about an axis perpendicular to the longitudinal axis of, or the line of flow through, the body.

In valve structures of the type under consideration snap rings have been used to secure together the assembly of the valve and its related parts within the bore of the tubular body. There are numerous applications, for example in aircraft, where the valve structure may be subjected to considerable vibration and shock which tends to dislodge the snap ring, whereupon the assembly may come apart and create a dangerous situation. Also, when overloads are imposed upon the snap ring, a component of force is applied tending to dislodge the ring from its mating groove. Moreover, the problem of achieving a secure assembly with a snap ring is present when the assembly is first made in the factory. The snap ring is located in the interior of a tubular body, and it is highly desirable that a positive inspection means be available to assure that the snap ring is properly and securely positioned in its mating groove.

An object of the invention is to provide means for co-operation with a snap ring to assure that the snap ring will be securely maintained in its proper position, though the assembly of which it is a part is subjected to vibration, shock and overload.

Another object of the invention is to provide means co-operating with a snap ring which will enable determination by visual inspection that the ring is properly seated in its mating groove, thereby assuring that the parts are securely assembled initially.

A more specific object of the invention is to mount a plug valve within a tubular body in a manner to assure the retention of the valve in proper position though the valve is subjected to substantial vibration and shock.

Still a further object of the invention is to provide simplified means for assuring that the valve is securely and properly assembled with its related parts, said means further enabling determination by visual inspection, at the point of assembly, that the parts are securely and properly assembled.

Still another object of the invention is to provide a valve of the rotatable ball type with detent means for indicating by feel whether the valve is in fully closed position, such means being formed integrally with, or as part of, the ball valve itself, thereby eliminating the necessity for additional parts to accomplish this purpose.

These, and other objects and advantages of the invention will be apparent from the specification which follows, taken together with the drawing, in which.

Generally, the invention is directed to an improved means for retaining a snap ring, such means being constructed to cooperate with a snap ring to limit the ring's ability to become distorted and escape from its mating groove despite the effects on the ring of substantial vibration, shock and overload forces. The snap ring retainer also serves to permit visual inspection for the determination whether the snap ring is properly positioned or seated within its mating groove. The snap ring retainer is particularly suitable for use in conjunction with a plug valve within the bore of a tubular body to assure the proper assembly of the valve and its related parts within the body.

Another aspect of my invention resides in forming or shaping a plug or ball valve so that the valve will cooperate with a spring biased valve retaining member to provide a detent for indicating when the valve is in its fully closed position.

Figure 1:
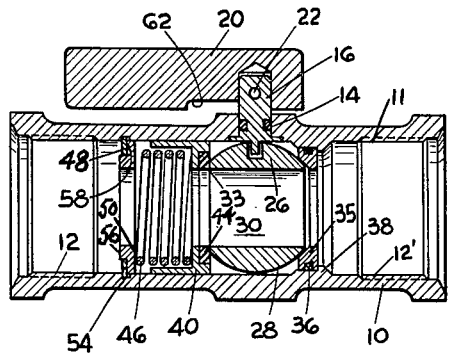
Fig. 1 is a vertical cross-sectional view of the valve structure of my invention, the valve being shown in open position.
Figure 2:
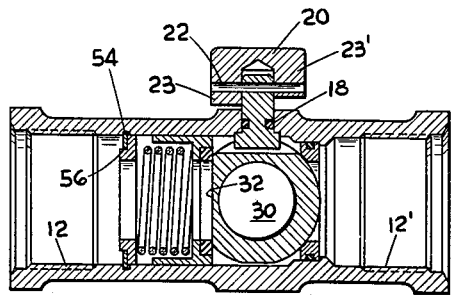
Fig. 2 is a view similar to Fig. 1, the valve being shown in closed position.
Figure 4:
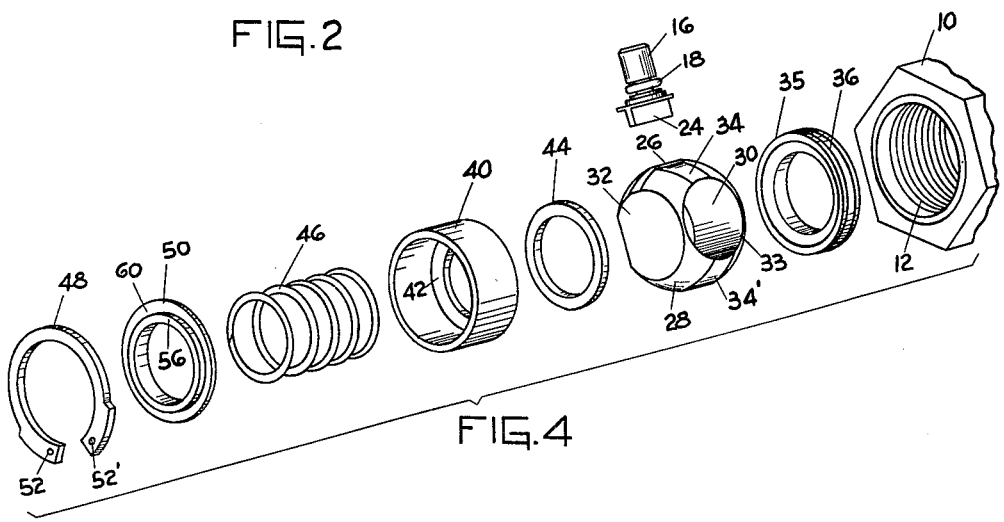
Fig. 4 is an exploded view showing in perspective all of the parts comprising the valve structure, with the exception of the handle for rotating the valve.

In greater detail, and referring to Figs. 1 and 4 for a preferred form of the invention, a hollow casing or tubular body 10 having an internal bore 11 extending therethrough is provided for conducting any suitable fluid, liquid or gas. The valve structure illustrated is particularly suitable for modulating the flow of hot air from a suitable source to de-icing equipment in aircraft. The ends of the tubular body are provided with internal threads 12, 12' to enable connection to externally threaded lines or conduits leading to the source and point of application of the fluid. The tubular body is provided with a radial opening 14 through which extends a valve shaft 16. The valve shaft is formed with an annular groove within which is disposed an O-ring 18 to furnish a suitable seal between the shaft and the adjoining wall of the body. A handle 20 is secured to the top end of the valve shaft by a spring type roll pin 22. As shown in Fig. 2, the roll pin is pressed through lateral openings provided in spaced downwardly extending portions 23, 23' of the handle, and through an aperture provided in the intermediate valve shaft. The lower end of the valve shaft is provided with a flat sided tongue or stud 24 adapted to be received within a mating spline groove 26 formed in a plug valve 28 having a bore 30 extending therethrough for the passage of fluid. The valve is thus rotatable about an axis generally perpendicular to the longitudinal axis of, or the line of flow through, the tubular body within which it is mounted.

The plug valve may be in the form of a cylinder or a substantially spherically shaped ball, the latter form being preferred and illustrated. In the preferred form of the invention, and as shown in Figs. 2 and 4, the valve is provided with a flat area or portion 32 formed on the side of the ball which faces the inlet side of the body's bore when the valve is rotated to closed position. The flattened area extends substantially parallel to the longitudinal axis of the valve's bore, and lies in a plane substantially 90° from the in-let side 33 of the bore through the valve. Also, the flat portion is at a right angle with respect to the length of the shaft-receiving groove 26. In addition, the outside diameter of the ball may be reduced at the areas 34 and 34', these reduced areas being on opposite sides of the ball, each 90° from the flat portion, and perpendicular with respect to the length of the shaft-receiving groove 26. The valve has disposed on the outlet side thereof, a valve seat 35. The valve seat is an annular, washer-like element, preferably formed of hard brass, having one side thereof suitably beveled or chamfered for mating engagement with the spherically shaped ball valve. The seat is provided with a circumferential groove within which is disposed an O-ring 36 of a suitable plastic material to provide a seal with the adjoining inner wall of the body. The side of the valve seat opposite the side which engages the valve is pressed against a radial, inwardly extending annular shoulder 38 formed in the tubular body.

The valve is resiliently pressed against the seat 35 by a spring biased valve retainer 40 having a diameter slightly less than the diameter of the bore of the tubular body for a close sliding fit therein. The valve retainer has a central opening, is annular in shape and includes a radial, inwardly extending shoulder portion 42, one side of which provides a recess for receiving a retainer bearing ring 44 of suitable material, such as Teflon or Kel-F. The other side of the shoulder provides a bearing for one end of a coiled spring 46 which urges the valve retainer and the retainer bearing ring against the valve. The assembly is completed by securing a snap ring 48 within the body together with a coacting snap ring retainer 50, the snap ring retainer also serving as a bearing for the opposite end of the spring 46. The snap ring is of the so-called internal type, as well-known in the art. Rings of this type are manufactured, for example, by Waldes-Kohinoor, and comprise a split ring provided with openings 52, 52' near each end thereof (Fig. 4), the openings being formed to receive projections on a tool so that the ring may be contracted and then allowed to expand. The ring is positioned in a mating, internal, annular groove 54 which extends radially within the tubular body and communicates with the body's bore.

The snap ring retainer 50 is annularly shaped, possesses a central opening and has an outside diameter slightly less than the diameter of the bore of the tubular body for a close sliding fit therein. The retainer may be made of a suitable hard plastic or metal. As shown in Figs. 1, 2 and 4, the snap ring retainer is provided with means for preventing the radial dimension of the snap ring from being changed to a diameter where the ring may escape from its mating groove. More specifically, the snap ring retainer is provided with an annular shoulder or flange portion 56 which, when assembled with the snap ring and related parts, extends parallel to the longitudinal axis of the body's bore 11 and passes through the snap ring when the snap ring is disposed within its mating groove. The flange portion having a smaller outside diameter than the diameter of the retainer at its outside periphery, a recess 58 is provided to receive a portion of the ring. The flange portion preferably has a height greater than the axial thickness of the ring. The retainer provides a bearing surface 60 for engaging the portion of the snap ring which extends into the bore of the tubular body. The retainer being resiliently urged axially in a direction parallel to the longitudinal axis of the tubular body, is resiliently pressed against the portion of the snap ring which extends into the bore.

The retainer's flange portion, which may be circumferentially continuous, as shown, or formed as a plurality of spaced upstanding segments positioned on a desired circumference, is dimensioned to provide an outside diameter greater than the inside diameter to which the snap ring may be contracted for its exit from the groove. Thus, as shown in Figs. 1 and 2, upon looking into the tubular body from the inlet end, if the flange portion is completely visible through the central opening of the snap ring (or the ring is seen to completely surround the flange portion), one is assured that the snap ring is properly seated in the groove 54. If the ring is not properly seated in the groove upon final assembly, the snap ring retainer may be retracted or pushed back axially against the spring 46, the ring removed and then properly reinserted. The snap ring, when properly in place, cannot escape the groove, though the assembly is subjected to vibration and shock, and the ring to overload; the flange portion does not permit the ring to be contracted or distorted sufficiently for it to escape from the groove.

Figure 3:
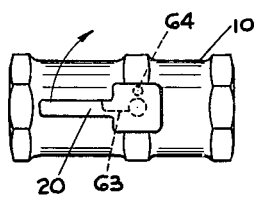
Fig. 3 is a top elevational view showing the tubular body containing the valve structure with the handle for turning the valve positioned so that the valve is open.

The assembly of the described parts is accomplished by first inserting the valve seat 35 from the inlet end of the tubular body 10 until the seat is in engagement with the internal shoulder 38. The valve shaft 16, with its O-ring 18 thereon, is inserted through the radial opening 14 and positioned with the tongue 24 extending parallel to the longitudinal axis of the tubular body, as shown in Fig. 2. The valve 28, oriented so that the groove 26 will receive the tongue 24, is inserted in the tubular body. A deep thread 12 may be used, because of the areas 34, 34' of reduced diameter which allow passage of the ball through the threaded area. The valve retainer 40 with the sealing ring 44 positioned against the shoulder 42 is then inserted into engagement with the valve. The coiled spring 46 is then inserted with one end thereof engaging the shoulder 42 of the valve retainer, following which the snap ring retainer 50 is pressed against the opposite end of the spring and depressed against the spring. The snap ring 48 is contracted, and then allowed to expand into the groove 54. The snap ring retainer then springs back, and when the flange portion 56 is entirely visible and surrounded by the snap ring, the assembly is complete, except for securing the handle 20 to the valve shaft 16, the connection of which has already been described. In order to provide a solid support for the handle, and a stop for the position of the handle when turned to valve-closed position, the handle is recessed on its underside at 62 to provide a shoulder 63 for engagement with an upstanding pin 64 fastened to the outside of the tubular body. Rotation of the valve from the open position of Fig. 1 to the closed position of Fig. 2 is accomplished by turning the handle in the direction of the arrow as indicated in Fig. 3.

As the valve is rotated from its open position of Fig. 1 toward the closed position of Fig. 2, the flat portion 32 on the side of the valve is engaged by the spring-pressed valve retainer 40, including the ring 44, to provide a detent which indicates by feel when the valve has been rotated to fully closed position. In fact, the flat portion on the valve cooperates with the spring-pressed valve retainer to snap the valve to fully closed position, and resiliently hold same in such position, when the valve nears its fully closed position. Thus, complete reliance need not be placed upon bringing the shoulder 63 up against the pin 64. When the valve is rotated from closed position to open position, the same kind of detent action or feel-indication is furnished by the engagement of the flat portion of the valve, where the bore 30 intersects the periphery of the ball, with the spring-pressed valve retainer.

It is believed that the advantages of the described snap ring retaining means, and valve structure including such retaining means, together with the simplified way for indicating the position of the valve, will be apparent from the foregoing detailed disclosure. It will also be apparent that while the invention has been described and illustrated in a preferred form, numerous changes may be made to obtain equivalent structures for the accomplishment of the described improved results without departing from the spirit and scope of the invention, as sought to be defined in the following claims.

I claim:

1. A valve structure comprising a tubular body having a bore for the passage of fluid therethrough, a plug valve mounted in said body for rotation about an axis perpendicular to the axis of flow through said body, said plug valve having a fluid conducting bore extending therethrough, said plug valve having an external surface of the revolution interrupted by a flat portion on the side thereof facing the inlet side of the body bore when the plug valve is closed with said flat portion being substantially parallel to the axis of the plug valve bore, a valve seat disposed within said body bore on the outlet side of the body bore, a plug valve engaging member axially movable within the inlet side of said body bore, and resilient means for pressing said plug valve engaging member against the plug valve, said plug valve engaging member having a surface engaging said plug valve at a zone displaced from the axis of rotation of said plug valve in a direction along the axis of said body bore, said plug valve engaging member surface engaging the flat portion of said plug valve when the plug valve is in its closed position to resiliently retain the plug valve in such position and to indicate that the plug valve has been rotated to its closed position.

2. A valve structure comprising a tubular body having a bore for the passage of fluid therethrough, a plug valve mounted in said body for rotation about an axis perpendicular to the axis of flow through said body, said valve having a fluid conducting bore extending therethrough, said valve having an external surface of revolution interrupted by a flat portion on a side thereof facing the inlet side of the body bore when the valve is closed, with said flat portion being substantially parallel to the axis of the valve bore, a valve seat disposed within said body bore on the outlet side of the body bore, a valve engaging member axially movable within the inlet side of said body bore, resilient means for pressing said valve engaging member against the valve, said valve engaging member having a surface engaging said valve at a zone displaced from the axis of rotation of said valve in a direction along the axis of said valve bore, said valve engaging member surface engaging the flat portion of said valve when the valve is in its closed position to resiliently retain the valve in such position and to indicate that the valve has been rotated to its closed position, a snap ring retainer disposed within the inlet side of said body bore and engaged by said resilient means, a snap ring groove in said body, and a snap ring having a portion thereof disposed within said groove and another portion projecting radially inwardly into said body bore, a portion of said snap ring retainer extending axially within said snap ring for preventng reduction in the diameter of the snap ring sufficient to allow removal of the snap ring from said snap ring groove.

3. A valve structure comprising a tubular body having a bore for the passage of fluid therethrough, a generally spherical plug valve both slidably and rotatably mounted in said body bore, means for rotating said valve about an axis perpendicular to the axis of flow through said body, said valve having a fluid conducting bore extending therethrough, a sliding connection between said valve rotating means and said valve extending in a direction normal to the axis of the bore in said valve, said valve having a flat portion on a side thereof facing the inlet side of the body bore when the valve is closed with said flat portion being substantially parallel to the axis of the valve bore, a valve seat disposed within said body bore on the outlet side of the body bore, a valve engaging member axially movable within the inlet side of said body bore, and resilient means for pressing said valve engaging member against the valve and hence pressing the valve against its seat, said valve engaging member having a surface engaging said valve at a zone displaced from the axis of rotation of said valve in a direction along the axis of said valve bore, said valve engaging member surface engaging the flat portion of said valve when the valve is in its closed position to resiliently retain the valve in such position and to indicate that the valve has been rotated to its closed position.

4. A valve structure comprising a tubular body having a bore for the passage of fluid therethrough, said bore having an inlet side and an outlet side, a generally spherical plug valve both slidably and rotatably mounted in said body bore, means for rotating said valve about an axis perpendicular to the axis of flow through said body, said plug valve having a fluid conducting bore extending therethrough, a sliding key connection between said rotating means and said plug valve extending in a direction normal to the axis of said valve bore, said plug valve having an imperforate flat portion on a side thereof facing the inlet side of said body bore when the valve is closed with said flat portion being substantially parallel to the axis of said valve bore, a reduced annular shoulder in said body bore on the outlet side of said body bore, a valve seat secured in said body bore between said shoulder and said plug valve, said plug valve having a spherical portion diametrically opposite said flat portion and engageable with said valve seat, an annular groove in said body bore on the inlet side of said plug valve spaced therefrom, a snap ring within said annular groove, a tubular sleeve slidably mounted in said body bore between said snap ring and said plug valve, a compression spring between said snap ring and said sleeve urging said sleeve into engagement with said plug valve, said spring also urging said plug valve into engagement with said valve seat, said sleeve engaging said flat portion on said plug valve when said plug valve bore is transverse to said body bore to resiliently retain said plug valve in such position.

References Cited in the file of this patent

UNITED STATES PATENTS

| | | |
|---|---|---|
| 684,565 | Caster | Oct. 15, 1901 |
| 1,185,585 | Bower | May 30, 1916 |
| 1,584,600 | Black | May 11, 1926 |
| 1,844,463 | Dodd | Feb. 9, 1932 |
| 1,867,296 | Woodruff | July 12, 1932 |
| 2,506,534 | Wolcott | May 2, 1950 |
| 2,603,452 | Spinney | July 15, 1952 |
| 2,649,277 | Blackford | Aug. 18, 1953 |
| 2,661,926 | Resek | Dec. 8, 1953 |
| 2,722,397 | Bruce | Nov. 1, 1955 |
| 2,820,477 | Dorsak | Jan. 21, 1958 |
| 2,866,213 | McArthur | Dec. 30, 1958 |
| 2,883,146 | Knox | Apr. 21, 1959 |

FOREIGN PATENTS

| | | |
|---|---|---|
| 863,360 | France | Jan. 2, 1941 |